United States Patent [19]
Beilsmith

[11] Patent Number: 5,899,659
[45] Date of Patent: May 4, 1999

[54] DEPALLETIZER COLLECTOR BELT ASSEMBLY

[75] Inventor: Timothy J. Beilsmith, St. Louis, Mo.

[73] Assignee: Alvey, Inc., St. Louis, Mo.

[21] Appl. No.: 09/070,672

[22] Filed: Apr. 30, 1998

Related U.S. Application Data

[63] Continuation-in-part of application No. 08/597,454, Feb. 2, 1996, Pat. No. 5,788,461.

[51] Int. Cl.$^6$ ..................................................... B65G 15/16
[52] U.S. Cl. ..................................... 414/796.2; 414/796.7; 198/594; 198/802
[58] Field of Search ................................ 414/796, 796.6, 414/796.7, 797.2, 796.2, 786; 198/812, 594, 592

[56] References Cited

U.S. PATENT DOCUMENTS

| | | |
|---|---|---|
| 2,254,550 | 9/1941 | Stevenson . |
| 2,701,064 | 2/1955 | Byington . |
| 3,327,872 | 6/1967 | Madden ................................ 414/797.2 |
| 3,521,763 | 7/1970 | Heide et al. . |
| 3,616,951 | 11/1971 | St. Clair et al. . |
| 3,836,018 | 9/1974 | Dawson et al. . |
| 3,935,941 | 2/1976 | Keck . |
| 4,106,635 | 8/1978 | Nishimura . |
| 4,613,268 | 9/1986 | Capdeboscq et al. . |
| 4,640,655 | 2/1987 | Jacobsen . |
| 4,710,089 | 12/1987 | Schneider . |
| 4,776,742 | 10/1988 | Felder . |
| 4,802,810 | 2/1989 | Gunn . |
| 5,046,603 | 9/1991 | Odenthal . |
| 5,249,915 | 10/1993 | Ritola . |
| 5,336,041 | 8/1994 | Seidel et al. . |
| 5,449,063 | 9/1995 | Thomas, Sr. ............................. 198/835 |
| 5,451,136 | 9/1995 | Easton . |
| 5,788,461 | 8/1998 | Easton et al. ........................ 414/796.2 |

FOREIGN PATENT DOCUMENTS

211393  2/1968  U.S.S.R. .

*Primary Examiner*—Karen M. Young
*Assistant Examiner*—Greory A. Morse
*Attorney, Agent, or Firm*—Varnum, Riddering, Schmidt & Howlett LLP

[57] ABSTRACT

A material handling system includes a depalletizer comprising a tower frame and a tilt bed which extends into the tower frame and is tilted to a predetermined angle. A lift bed raises a loaded pallet to the level of an exit conveyor. A back dam is disposed opposite the exit conveyor and is movably mounted to the frame to exert a stop against a layer of articles to be removed. An endless collector belt, mounted to the tower frame, extends over a slidable frame provided with a polygon shaped roller. The endless belt simultaneously rotates and moves between a position adjacent the exit conveyor and a position adjacent the back dam to remove the entire layer of articles.

31 Claims, 10 Drawing Sheets

DEPALLETIZER COLLECTOR BELT ASSEMBLY

This application is a continuation-in-part of application Ser. No. 08/597,454, filed Feb. 2, 1996, entitled AUTOMATIC DEPALLETIZER, now U.S. Pat. No. 5,788,461.

BACKGROUND OF THE INVENTION

1. Field of the Invention

This invention relates to material handling systems and more particularly to a collector belt assembly for use in a material handling system.

2. Description of Related Art

Material handling systems are commonly used to move materials in warehouses and the like, preferably with a minimum of human labor. In a typical warehousing operation, pallets loaded with articles, or units, such a cartons or other loaded containers are transported to a warehouse or distribution center. There, the goods are depalletized, i.e., removed from the pallets, and stored in the warehouse or directed elsewhere for further distribution. The depalletizing operation is performed primarily by human labor. It is, therefore, a relatively expensive and time consuming operation. It is also an operation which leads to injuries since the individual units to be handled may weigh on the order of 60 lbs. or more and a great deal of reaching is often required. Attempts have been made to automate the unloading of pallets. A complication, however, in automatic depalletizing is that the units loaded on the pallets are often not of uniform dimensions and a variety of sizes and shapes of units must be accommodated. Also, the units must be handled with sufficient care to avoid damage. Furthermore, the orientation of the units as they are unloaded from the pallets onto a conveyor or the like may have to be controlled. Particularly in cases where a certain side of the unit must be read by a bar code reader or the like.

One known depalletizer is disclosed in U.S. Pat. No. 4,106,635 entitled Elevatable Depalletizing System. That system includes a lift table, supported on a tiltable mast, used to raise the loaded pallet to the level of a chute. The tiltable mast is tilted until the articles of the uppermost layer begin to slide off. The chute includes a stopper mechanism which allows only one row of a layer of articles to slide off at a time. A problem with this prior art arrangement is that it relies on the angle of tilt of the mast to remove the individual units from the pallet. While that may be effective for certain goods, it will tend to cause units with a relatively small base, compared to its height, to topple. That may cause damage, but will also change the orientation of the unit in an unacceptable way. The chute mechanism allowing only one row to be removed at one time adds delay and reduces system throughput.

Another depalletizer system is disclosed in U.S. Pat. No. 5,451,136, which is herein incorporated by reference. That system includes an automated depalletizer with a lift bed and a tilt bed angled at 30 degrees, and further includes a collector roller associated with the tilt bed to move any units of a layer which are not otherwise removed at the predetermined tilt of the tilt bed, in a discharge direction. The collector roller is rotatably driven toward the remaining units. A sheet of relatively low friction material moves with the collector roller and provides a low friction surface for the sliding removal of the remaining units from the pallet. Although that system is an improvement over the prior art, it was found that the 30 degree incline of the tilt bed causes some smaller boxes to topple when engaged by the collector roller and low-friction sheet. In addition, that system requires a three-step process wherein units of a layer are first expected to slide off from a lower layer in response to gravity, then any remaining units are detected, and finally the collector roller is moved toward the units for removing the remaining units. This three-step process is time consuming since all units of a layer are not always simultaneously removed.

SUMMARY OF THE INVENTION

These and other problems of the prior art are overcome in accordance with this invention by an automated depalletizer with a lift conveyor and a tilt bed, which is not tilted beyond a predefined angle, and further provided with means to assist the removal of units from the pallets.

In accordance with one aspect of the invention, a continuous belt has an upper surface which is lengthened from a home position to an extended position. The belt is simultaneously rotated as it is lengthened until all units of a layer are mounted thereon. The belt rotation causes all units to be discharged to a metering belt and finally to a roller conveyor.

In accordance with another aspect of the invention, the upper surface of the continuous belt is lengthened by movement of a nose portion of the collector belt assembly from a retracted position to an extended position and the nose portion includes a rotatable roller engaging an inner surface of the continuous belt to facilitate extending the upper surface of the belt.

In accordance with a further aspect of the invention, the rotatable roller comprises opposite ends and preferably has a cross section shaped in the form of a polygon with a plurality of substantially flat surface areas extending between the opposite ends of the roller. Advantageously, the flat surface areas aid in the removal of units from the pallets.

In accordance with another aspect of the invention, the depalletizer comprises a back dam assembly which provides a back stop for a layer of units to be removed. In one particular embodiment of the invention, the lift conveyor is tilted and raised by a selected distance prior to extension of the continuous belt and the back dam is moved to an extended stop position for preventing units from being pushed off the pallet in the wrong direction as the continuous belt applies a loading force against the units.

In accordance with another aspect of the invention, the depalletizer includes a controller associated with a plurality of sensors and the lift conveyor. The sensors detect the presence of an upper layer of units on the pallet and send a signal to the controller for raising the lift conveyor a predetermined distance, which is preferably slightly less than the layer height. The controller causes the endless belt to move to its extended position to unload the units. The controller further causes the endless belt to retract as the units are unloaded.

In accordance with another aspect of the invention, a base for positioning pallets prior to being lifted by the lift conveyor moves pallets laterally to a position adjacent to the back wall of the tilt bed.

BRIEF DESCRIPTION OF THE DRAWING

An embodiment of the invention is described below with reference to the drawing wherein.

DETAILED DESCRIPTION

Figure 1:
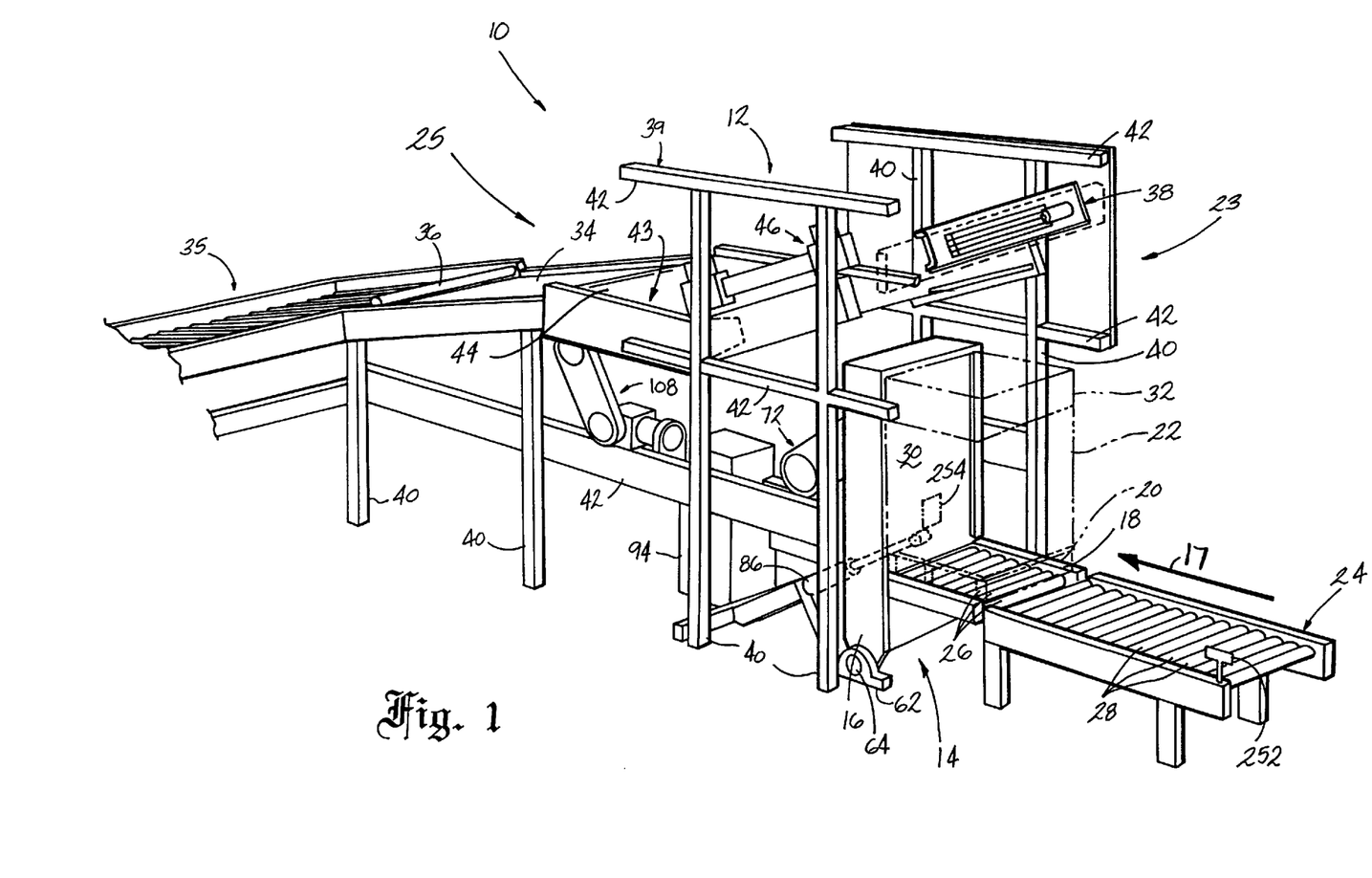
FIG. 1 is a perspective representation of a material handling system including an automatic depalletizer incorporating principles of the invention.

FIG. 1 depicts a material handling system 10 including a depalletizer 12 comprising a tower frame 39 provided with support posts 40 and cross members 42. Tower frame 39 includes a first loading end 23 and a second unloading end 25. A tilt/lift module 14 is partially disposed within the tower frame 39 and includes a tilt bed 16 and a lift bed or lift conveyor 18. Shown in phantom line is a plurality of units 22 stacked on a pallet 20 and including an upper layer 32. Units 22 may include cartons, boxes, containers, etc. and are moved together with pallet 20 toward the tilt\lift module 14 by means of a standard accumulator conveyor 24. The pallet is moved onto lift conveyor 18 after the tilt bed 16 has been brought to the upright position and the lift conveyor 18 has been lowered to a position wherein powered line rollers 26 of lift conveyor 18 are level with the accumulator rollers 28 of the accumulator conveyor. The powered rollers 26 move the loaded pallet 20 in the direction of the tilt bed 16 as shown by arrow 17 and against back wall portion 30 of tilt bed 16. A proximity detector 254 is appropriately placed to indicate when the pallet is properly positioned with respect to the back wall portion 30. Thereafter, the tilt bed 16 is tilted into the area defined by the tower frame 39. The loaded pallet is then lifted with the lift conveyor 18 to a level wherein the upper layer 32 of the pallet 20 reaches a desired level. The height to which the loaded pallet 24 is raised by the lift conveyor 18 is determined in part by the height of the exit conveyor, which in this particular implementation is a metering belt assembly 34. The metering belt assembly 34 operates at three different speeds to transfer the depalletized units to a well-known unscrambler conveyor 35 oriented at a right angle with respect to direction arrow 17 which causes the units to be aligned and transported to any desired location. A kicker roller 36, operating intermittently at a relatively high speed is mounted between the metering belt assembly 34 and the unscrambler conveyor 35. Kicker roller 36 serves to separate rows of units of a layer of units unloaded from the pallet and directs the units toward one side of the conveyor 35.

When the top portion of the upper layer of a pallet to be unloaded reaches a selected height within the tower, a back dam assembly 38 is moved from a home position to an extended position (shown in phantom line) in the direction of unloading for contacting and applying a stop for an upper layer of units to be removed and an adjacent lower layer. A collector belt assembly 43 includes a continuous collector belt 44, which may be of the wedge-grip type, mounted for movement from a home position to an extended position along a guide portion 46. The guide portion 46 is securely mounted between an upper portion of support posts 40 of tower frame 39 adjacent to the loading end 23. The collector belt 44 is simultaneously rotated and lengthened as it extends along a lower edge of a layer of units on a pallet until all units of the layer are deposited on the collector belt. The belt rotation causes all units to be discharged to the metering belt. After all units of a layer have been removed from the pallet and loaded onto the collector belt, the collector belt is retracted, the pallet is raised and the next layer is removed by the rotation and extension of the collector belt 44. After all layers of a pallet have been unloaded, the pallet is lowered and removed from lift conveyor 18 by reversing the rotational direction of powered line rollers 26.

Figure 2:
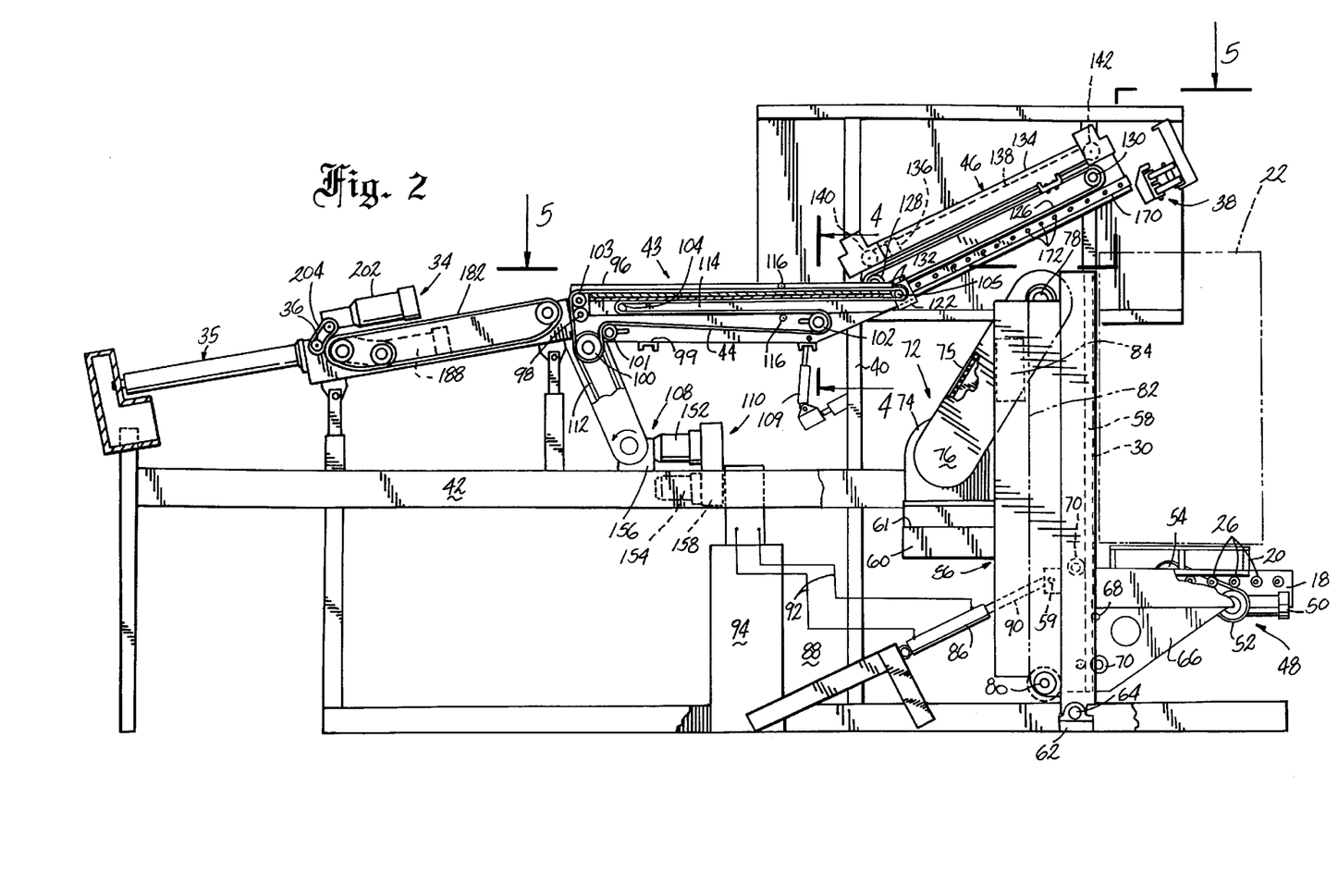
FIG. 2 is a side elevational view of the automatic depalletizer of FIG. 1 showing the endless loop belt in a retracted position.
Figure 3:
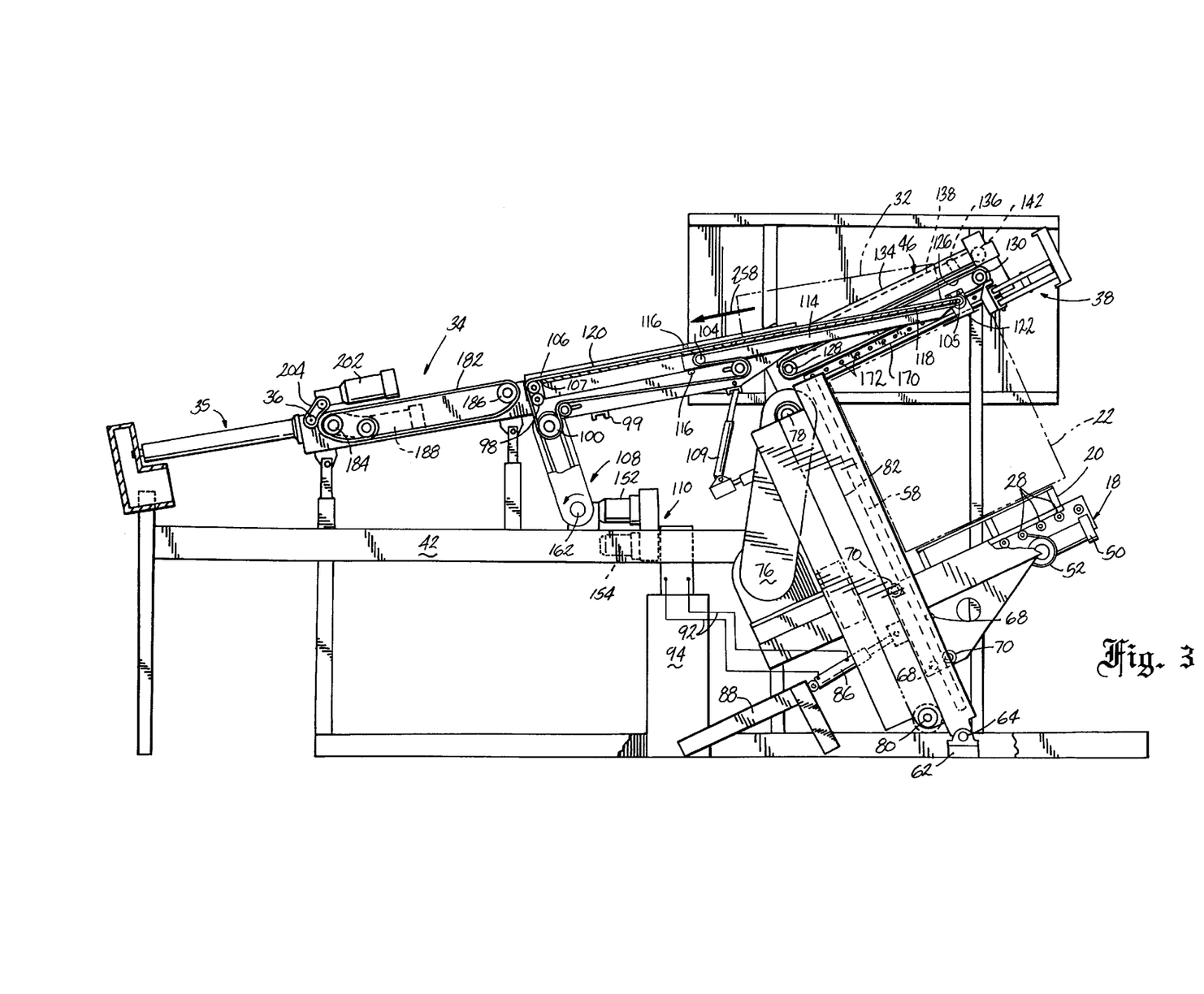
FIG. 3 is a side elevational view similar to FIG. 2 showing the endless loop belt in the extended position.

As shown in FIGS. 2 and 3, powered rollers 26 of lift conveyor 18 are driven by a well-known drive unit 48 which includes a motor 50 and continuous chain 52 attached between the motor 50 and a sprocket 54 on the lift conveyor 18, such that the rollers 26 are powered for moving a pallet towards back wall portion 30. Back wall 30 forms part of a lift support frame 56, having a vertical frame member 58 (shown in hidden line) rigidly attached to a horizontal frame member 60 and pivotally attached to a pivot base 62. The tilt/lift module 14 is pivoted about a bearing 64 located in pivot base 62 such that lift conveyor 18 can be pivoted from horizontal through approximately 25 degrees from horizontal. Although 25 degrees is a preferred range, other pivoting ranges are possible.

A lift conveyor support bracket 66 is fixedly secured to a bottom of lift conveyor 18, and includes small guide rollers 68 placed on opposite sides of vertical frame member 58 and large guide rollers 70 positioned at opposite sides of vertical frame member 58 and vertically spaced from small guide rollers 68. Guide rollers 70 are constructed larger than guide rollers 68 since they bear the weight from lift conveyor 18, pallet 20, and units 22.

Horizontal frame member 60 is attached to vertical frame member 58 and includes an upper surface 61 having a drive unit 72 securely mounted thereto. Drive unit 72 includes an electric motor 74 and an endless drive chain 75 located behind a chain cover 76 and connected between a motor sprocket (not shown) and an upper idler sprocket 78. Upper idler sprocket 78 is rotatably attached to an upper portion of tilt/lift module 14. A lower idler sprocket 80 is rotatably attached to a lower portion of the lift support frame 56. An endless lift chain 82 (shown in phantom line) is attached between upper and lower sprockets assemblies 78, 80. Lift conveyor support bracket 66 is attached to endless lift chain 82, such that when the drive unit 72 rotates the upper idler sprocket 78, the endless lift chain 82 is caused to rotate and thereby raises the lift conveyor 18 from a lower position to an upper position. Lower idler sprocket 80 has a rotary encoder (not shown) associated therewith, such that the height of the lift conveyor 18 may be constantly monitored for a purpose to be explained in greater detail below. A counter weight assembly 84 (shown in phantom line) is attached to the endless lift chain 82 at a position to permit the weight of lift conveyor 18 to be counterbalanced at any height position. This permits a smaller drive unit 72 to be used.

Two hydraulic cylinders 86 (only one shown) are attached between a cylinder support frame 88 and lift support frame 56. Each hydraulic cylinder 86 has a hydraulic cylinder rod 90 which is pivotally attached to lift support frame 56 through a pivot pin 59 (shown in hidden line). Each of the hydraulic cylinders 86 includes two power stroke lines 92 for pivoting lift support frame 56 from a substantial vertical position to approximately 25 degrees from vertical, as shown in FIG. 3, and back again to the vertical position. Power stroke lines 92 are attached to a hydraulic power unit 94.

Figure 5:
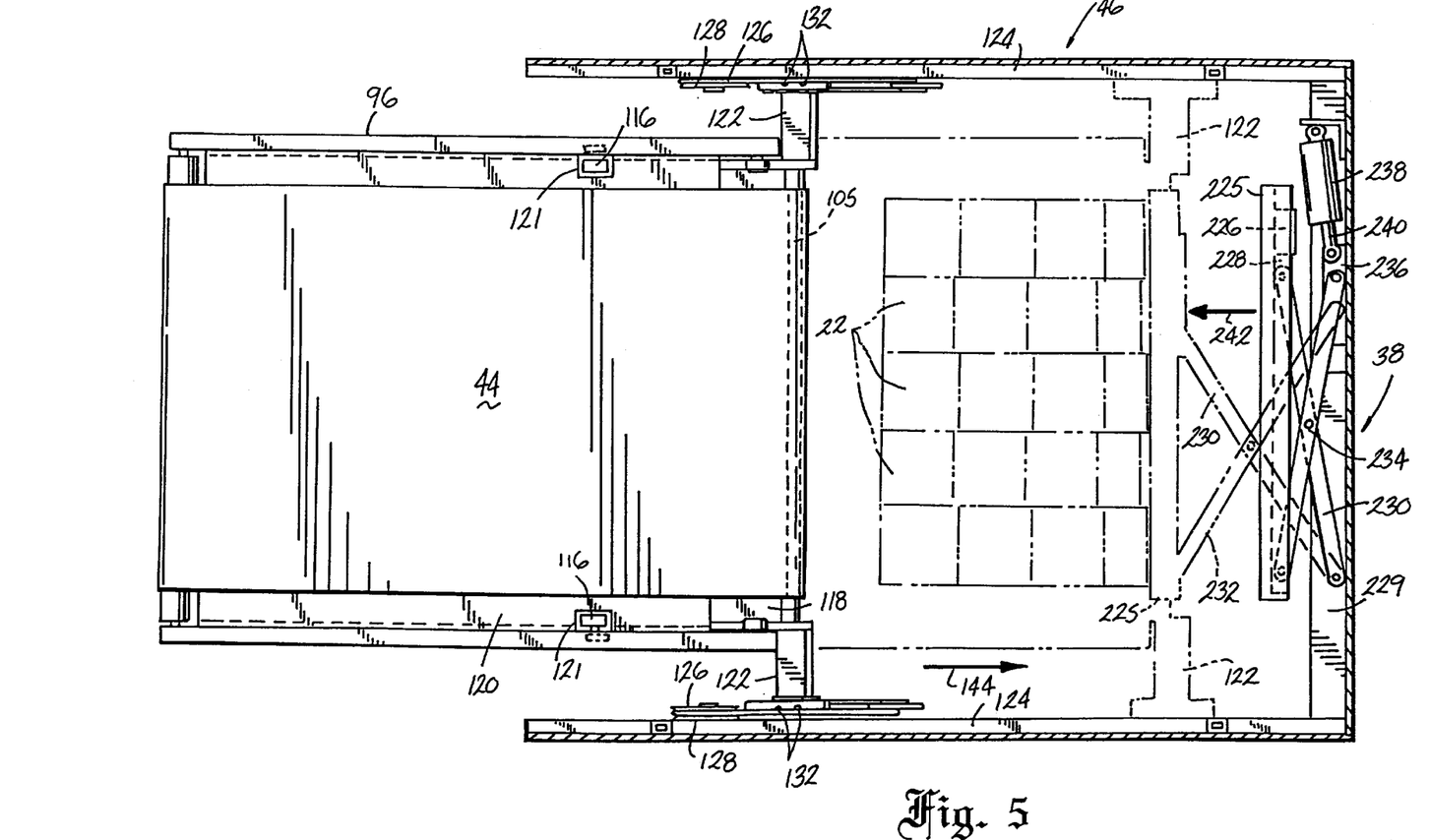
FIG. 5 is a partial sectional view taken along line 5—5 of FIG. 2.

A pivot frame 96 supports the collector belt assembly 43 and pivots about a pivot point 98. Collector belt assembly 43 includes a belt drive pulley 100, idler rollers 101, 102, 103, and 104 mounted for rotation on a support frame 114. A nose portion 105, including a rotatable shaft having a polygon shaped cross-section, is mounted between two bracket assemblies 122 (FIG. 5). Idler roller 104 and nose portion 105 are positioned a fixed distance from each other on support frame 114. The continuous wedge-grip type collector belt 44 includes a first surface 106 of a high friction material, such as rubber tread, and a second low friction surface 107. A collector belt drive unit 108 rotates collector belt 44 in a counterclockwise direction as seen in FIGS. 2 and 3, and includes a drive belt 112 mounted between a drive motor assembly 110 and the drive pulley 100. Collector belt 44 passes around drive pulley 100, around idler rollers 101, 102, 104, and then around the nose portion 105, and finally around idler roller 103 and back to drive pulley 100. Idler rollers 101, 102, and 103 are adjustable with respect to pivot frame 96 in a well known manner, such that proper collector belt tension can be maintained.

Figure 4:
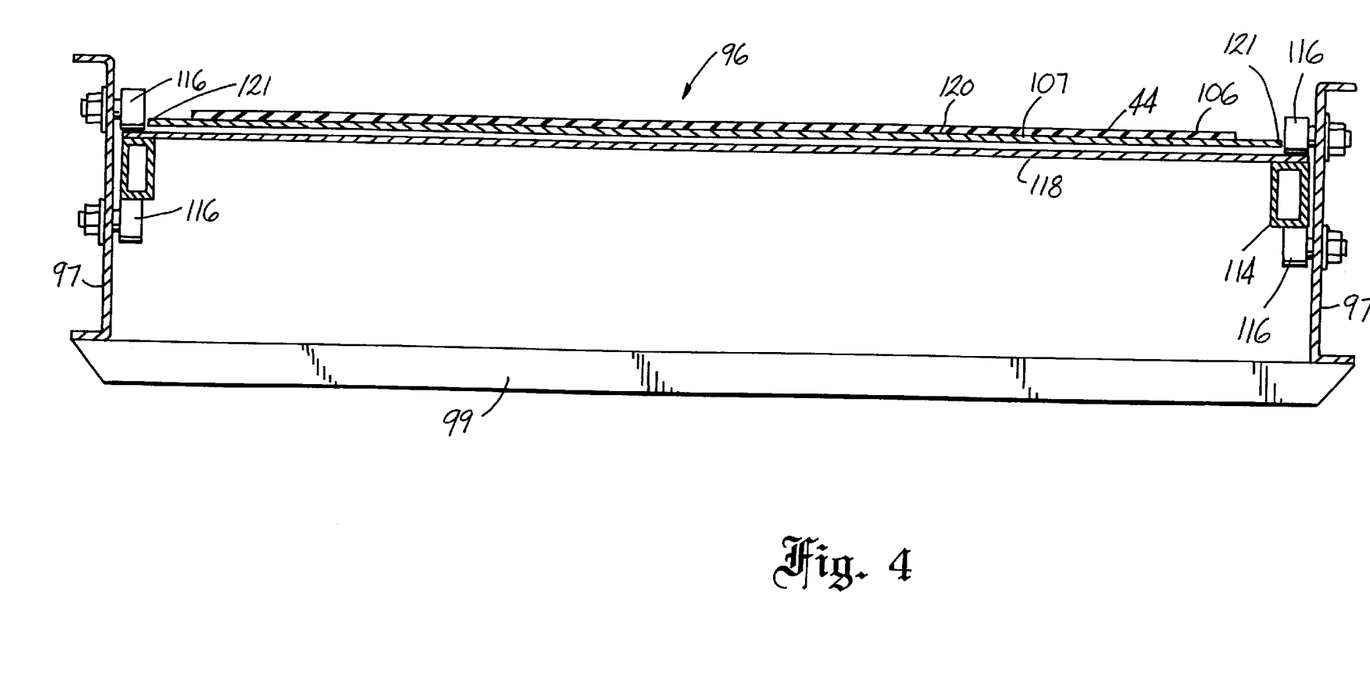
FIG. 4 is a partial sectional view taken along line 4—4 of FIG. 2.

As shown in FIGS. 4 and 5, pivot frame 96 includes two C-beams 97 spaced apart a distance greater than the width of collector belt 44 and connected by cross-beams 99, as shown in FIG. 4. The support frame 114 is slidably supported on pivot frame 96 through a pair of roller bearings 116 mounted to each C-beam 97. A lower telescoping plate 118 is mounted on support frame 114 and extends under an upper plate 120 mounted to the pivot frame 96. The upper plate 120 is stationary and the lower plate 118 moves with the support frame 114 to lend support to the continuous belt 44 over the extended pivot frame portion 96. The upper support plate 120 lends support to the continuous belt 44 in the nonextendable portion of pivot frame 96. Upper support plate 120 includes a pair of notches 121 for receiving the upper roller bearings 116 of the roller bearing pairs therethrough. FIG. 2 shows at least one damping cylinder 109 attached between pivot frame 96 and one of the support posts 40. Cylinder 109 is spaced from pivot point 98 and provided to support some of the weight on the bracket assemblies 122 resulting from the collector belt assembly and any units that may be supported thereon.

Referring to FIGS. 2 and 5, each bracket assembly 122 is pivotally secured to opposite ends of nose portion 105 and located on each side of lower telescoping plate 118. A set of cam followers (not shown) are rotatably attached to each bracket assembly 122 and are arranged to follow along a guide channel 124 of guide assembly 46 located at each side of the collector belt extending guide portion 46. An endless chain 126 is located at each side of the guide assembly 46 and mounted between a lower idler sprocket 128 and an upper transfer drive sprocket 130. The drive sprockets 130 are mounted on a common rotatable shaft (not shown) to maintain alignment. The chain 126 includes pins 132 that mount bracket assembly 122 thereto. Each bracket assembly 122 is movable between lower and upper positions depending on the position of chains 126. The position of chains 126 is controlled by a fluid operated cable cylinder 134 mounted on one side of tower frame 39. Endless chain 126 is associated with one of the bracket assemblies 122. The cable cylinder 134 includes a piston 136 (shown in hidden line) located in the interior thereof, and an endless loop cable 138 that extends from both sides of the piston 136 around two idler pulleys 140 and 142 (shown in hidden line). The cable cylinder 134 is a well-known prior art positioner and will not be further described in detail. A four-way valve (not shown) is supplied for the cable cylinder 134. When a first valve is actuated, pressure from hydraulic fluid or air supplied through the first valve pushes the piston while hydraulic fluid or air is exited from the cylinder via the second valve. Likewise, when the second valve is actuated, hydraulic fluid or air supplied through the second valve pushes the piston while hydraulic fluid or air is exited via the first valve. This permits the piston 136 to be moved in opposite directions depending on which valve is actuated. The endless loop cable 138 is connected to the endless loop chain 126, such that any movement in piston 136 causes an equal movement in the associated bracket assembly 122, and thus in nose portion 105 and lower plate 118. Although it is preferred that each bracket assembly 122 is associated with an endless chain 126 to avoid binding and twisting of the collector belt 44, a set of dual cable cylinders or any other well-known positioning device can be used.

The extending guide assembly 46 is preferably angled at approximately 25 degrees with respect to the horizontal, such that units 22 on pallet 20 are aligned substantially parallel with the line of travel, indicated by arrow 144 (FIG. 5), of the nose portion 105 and lower plate 118 when the lift bed 16 is tilted to the preferred position of approximately 25 degrees from horizontal.

In the initial or home position, as shown in FIG. 2, piston 136 is located at a lower end of cable cylinder 134. As the valve is actuated, piston 136 moves toward the upper end of each cable cylinder 134. Simultaneously, bracket assembly 122 moves in alignment with piston 136 such that nose portion 105 and lower plate 118 follow the line of travel as denoted by arrow 144 (FIG. 5) from a lower part of extending guide portion 46 to an upper part thereof. As lower telescoping plate 118 extends past upper support plate 120, the collector belt 44 is supported by both the lower telescoping plate 118 and upper support plate 120. Since idler roller 104 and nose portion 105 are positioned a fixed distance from each other on support frame 114, the tension in collector belt 44 remains unchanged. Continuous belt 44 thus extends from an initial or home position shown in FIG. 2 to an extended position shown in FIG. 3. As collector belt 44 extends, pivot frame 96 pivots about pivot point 98 such that the angle of collector belt 44 increases from about zero degrees with respect to horizontal at the home position to approximately 10 degrees at the extended position. This is a vast improvement over prior art systems, since the units are much less likely to topple over when angled between zero and ten degrees. Due to the small angular incline of the extended collector belt 44, it is now possible to depalletize smaller and less stable units. The speed at which collector belt 44 extends is regulated by the particular construction of cable cylinder 134 and the amount of fluid pressure applied thereto.

The collector belt drive unit 108 includes a drive motor assembly 110. According to a preferred embodiment, drive motor assembly 110 includes an upper high-speed motor 152 and a lower low-speed motor 154 (shown in hidden line), as shown in FIGS. 2 and 3. Upper and lower motors 152, 154 are attached to a cross member 42 and each include a gear reduction unit 156, 158, respectively, that cooperate to produce a double reduction gear motor assembly. The collector belt drive unit 108 includes the endless roller chain 112 mounted for rotation between belt drive pulley 100 and motor drive sprocket 162. When collector belt 44 extends, low-speed motor 154 drives belt 44 at a constant speed of approximately five to fifteen feet per minute. The collector slow speed is correlated to the collector extend speed such that the units are pulled onto the collector belt at a speed that prevents the rows of units behind the row being collected from sliding forward out of position and in an unstable manner. When nose portion 105 reaches its fully extended position, a proximity switch (not shown) signals to a system controller to shut off lower motor 154, actuate upper motor 152, and retract the nose portion 105. Upper motor 152 causes collector belt 44 to operate at a much higher speed, e.g., approximately 160 feet per minute. Thus, units loaded onto collector belt 44 will be moved at the rate of 160 feet per minute. Although specific collector belt speeds and angles of operation have been described, other speeds and angles are possible depending on particular system requirements. Moreover, although the two-motor configuration is preferred, motor assembly 110 can be replaced with a single motor of the variable frequency type for providing the required speeds. In addition, low-speed motor 154 can be of the variable frequency type or can be of a single speed. However, for small units, i.e. of about six inches or less in height, a variable frequency type motor is preferred since a slower speed for smaller units further prevents toppling the units as they are depalletized.

A light curtain 170 is located parallel to guide channel 124 of extending guide portion 46. Light curtain 170 includes a plurality of light emitter/detector pairs 172 spaced at predefined intervals parallel to channel 124, such that even a single small unit on a layer can be detected by the light curtain 170. In a preferred embodiment of the invention, the light curtain is designed to detect units down to 1½ inches in height. This is a vast improvement over prior art.

The metering belt assembly 34 includes a well-known endless loop metering belt 182 mounted around a drive roller 184 and an idler roller 186. A frequency drive motor or three-speed motor 188 connected to drive roller 184 causes belt 182 to travel in a counter-clockwise direction as seen in FIGS. 2 and 3. Drive motor 188 is capable of rotating endless loop belt 182 at three separate speeds. The first speed is at 160 feet per minute which is equal to the speed of the units coming off collector belt 44. Once all boxes from the layer are loaded onto belt 182, frequency drive motor 188 causes metering belt 182 to slow down to approximately 40 feet per minute and then to approximately 15 feet per minute. This prevents the units from toppling over and being pushed over the kicker roller since abrupt changes in speed are avoided, and closes any gaps that may exist between units of a layer for more efficient unloading of units to the unscrambler conveyor 35. When the unscrambler conveyor is oriented parallel to the direction as shown by arrow 17 (FIG. 1), metering belt assembly 34 may operate at only one speed or may be replaced by other well-known conveyor systems for displacing the depalletized units.

A kicker roller 36 is driven by a kicker drive motor 202 through a kicker drive chain 204 as is known in the art. Kicker drive motor 202 is cycled on and off to rotate kicker roller 36 quickly in order to transfer a row of boxes touching kicker roller 36 to the unscrambler conveyor 35. When the unscrambler conveyor is oriented parallel to the direction as shown by arrow 17, the kicker may not exist, or may run continuously to pull the gap between rows of units.

FIG. 5 shows the collector belt 44 and back dam assembly 38 in their original positions and further shows these devices in their extended positions, represented by phantom lines. The back dam assembly 38 includes a back stop 225 of approximately the same width as collector belt 44 for restraining any units located on the collector belt. Back stop 225 is parallel to back dam frame 229 and includes a slider 228 retained in a channel 226 (shown in hidden lines) for slidable movement relative thereto. Slider 228 is pivotally attached to a first pivot arm 230 at a first end thereof. The first pivot arm is pivotally attached to back dam frame 229 at a fixed point. A second pivot arm 232 is pivotally attached to back stop 225 at one end and slidably attached to frame 229 through a slider 236. Slider 236 is pivotally attached to pivot arm 232. First pivot arm 230 is also pivotally attached to second pivot arm 232 at a pivot point 234. An actuator cylinder 238 is attached to frame 229 and includes a piston 240 movable in and out of the cylinder 238 under fluid pressure. An outwardly extending end of the piston 240 is pivotally attached to slider 236. In operation, as piston 240 is extended out of cylinder 238, slider 236 is pushed along frame 229 causing arms 230, 232 to rotate about pivot point 234. Slider 228 is simultaneously moved in the same direction as slider 236. Arms 230, 232 rotate equally and therefore cause back stop 225 to move toward units 22 as shown by direction arrow 242, while maintaining a parallel relationship to frame 229. Likewise, when piston 240 is retracted into cylinder 238, back stop 225 is moved to its retracted position. The operation of back dam assembly 38 in conjunction with the tilt/lift module 14, the collector belt 44, and other components previously described is set forth in greater detail below.

Figure 6:
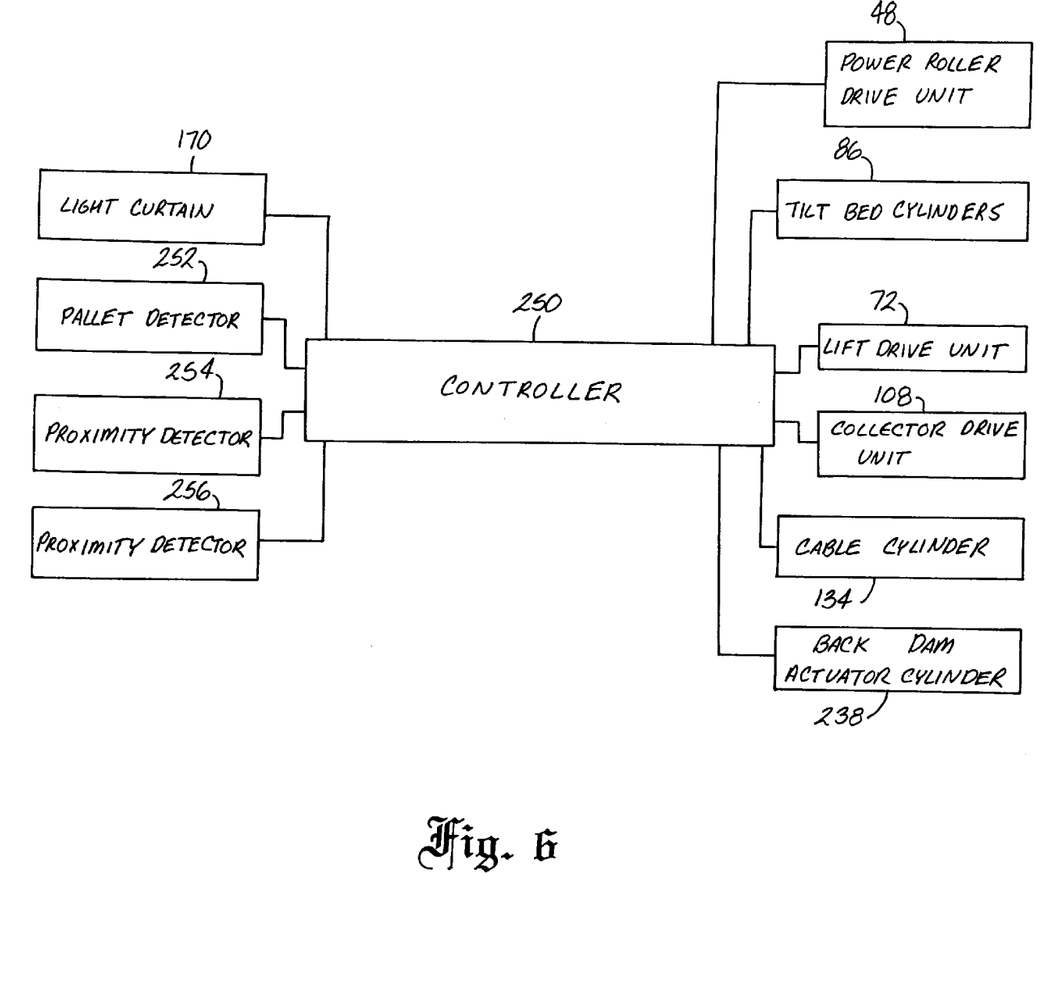
FIG. 6 is a schematic representation showing a control arrangement for controlling the operation of the depalletizer of FIG. 1.

FIG. 6 is a block diagram representation of the system controller 250. The various units of the depalletizer 12 are controlled by controller 250 in response to various detectors which form part of the depalletizer 12. In a system such as depicted in FIG. 1, the controller 250 will perform a number of other functions for controlling various conveyors and associated equipment. Such other functions are known in the art and are not described herein. The controller 250 may be any one of a number of well known and commercially programmable controllers.

Figure 7:
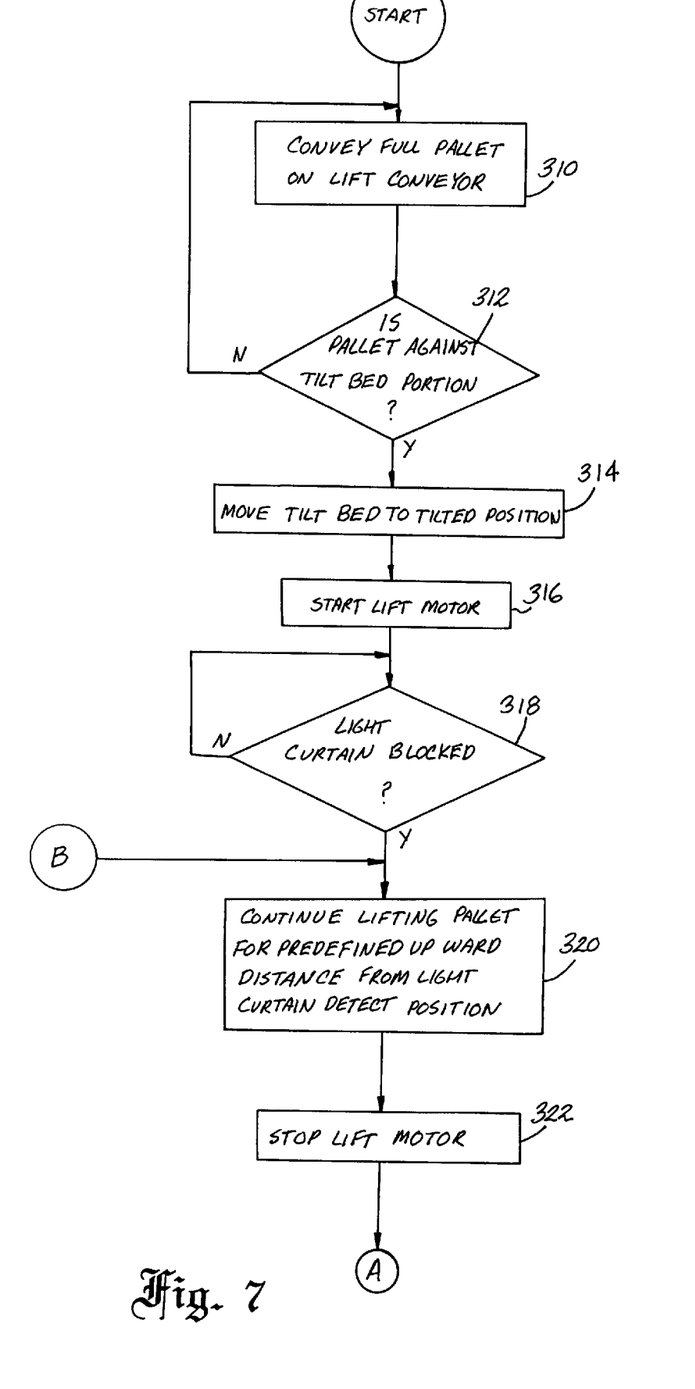
FIGS. 7–9 are flow diagram representations of the operation of the depalletizer of FIG. 1.
Figure 8:
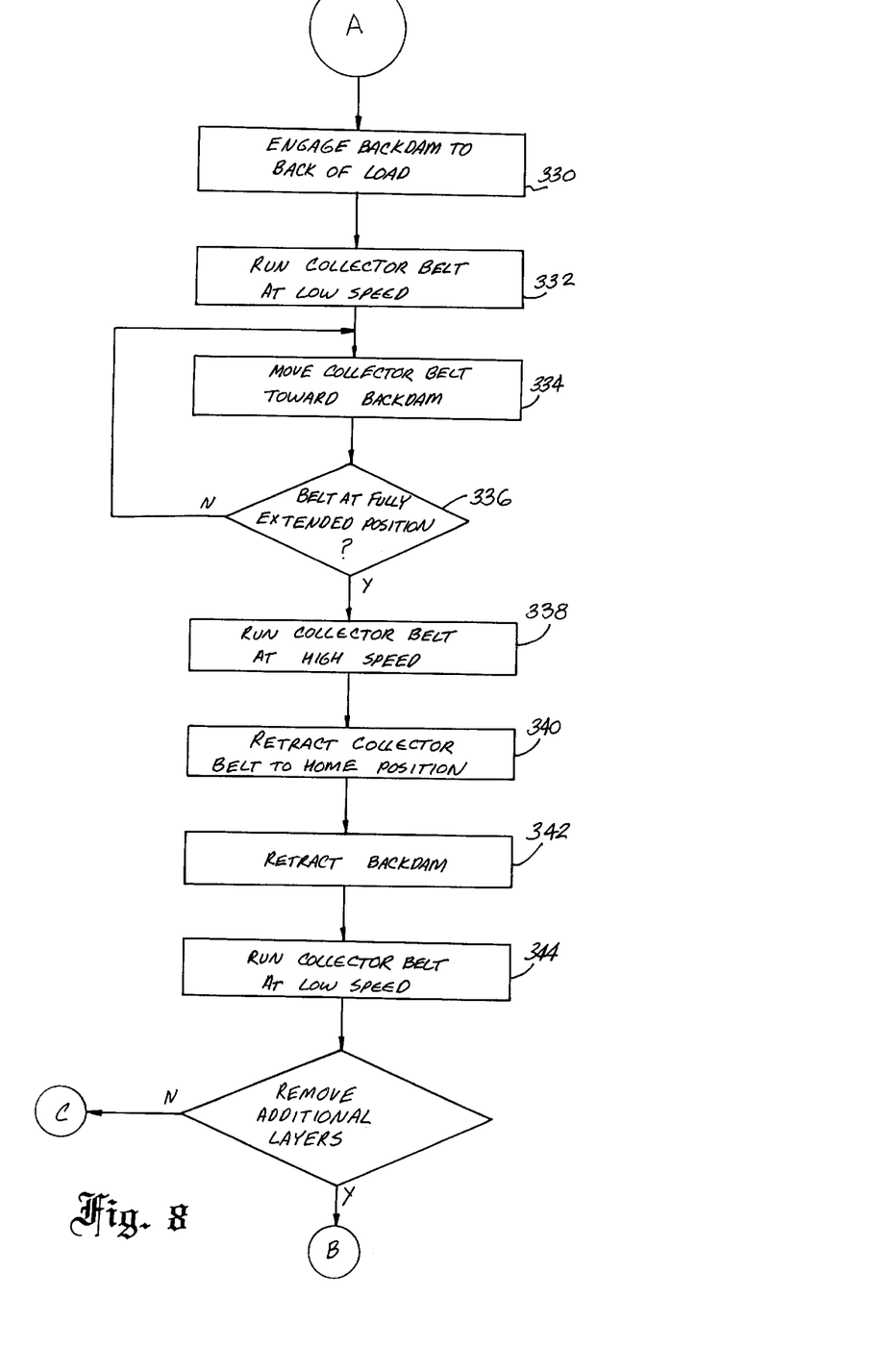
Figure 9:
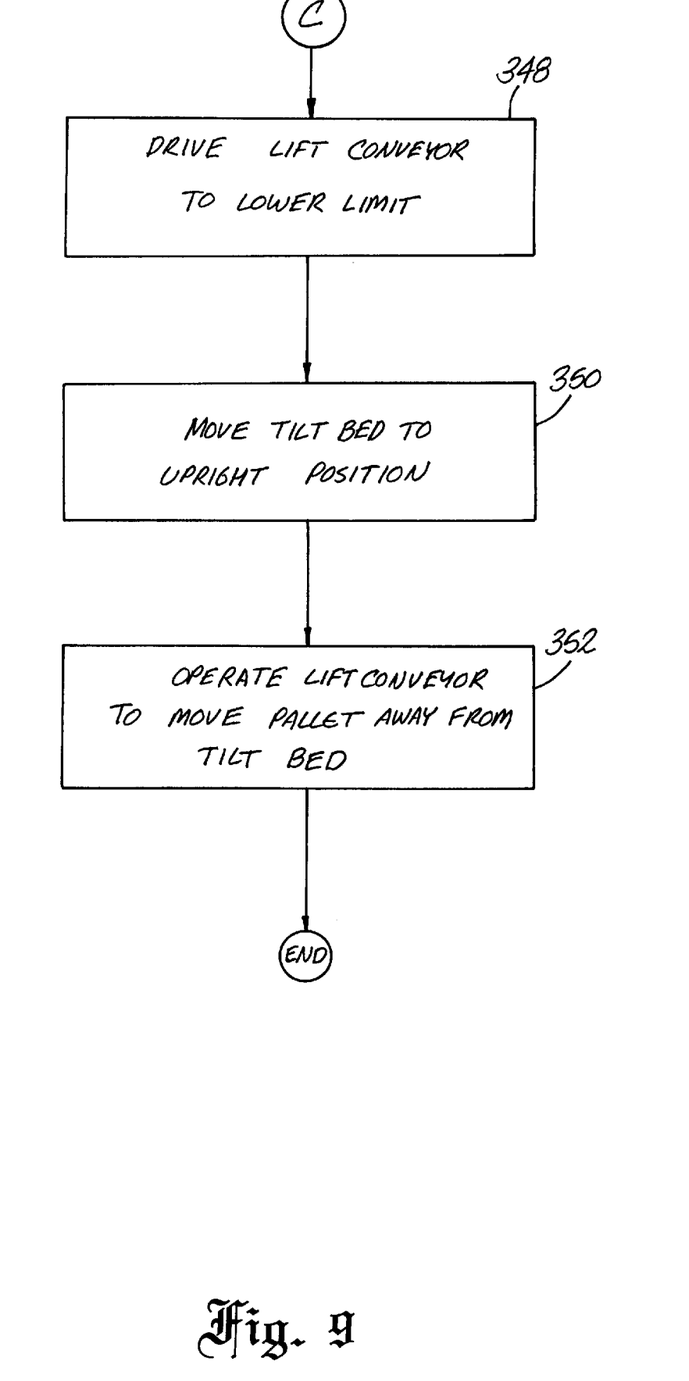

FIGS. 7–9 show a flow diagram of the functions performed by the controller 250. At the beginning of the operation, a full pallet such as the pallet 20 is moved onto the lift conveyor 18 by operation of the powered line rollers 26. Prior to beginning the depalletizing operation, the tilt bed 16 will have been moved to the upright position and the lift conveyor 18 will have been lowered such that the powered line rollers 26 of the lift conveyor 18 are level with rollers 28 of accumulator conveyor 24 as shown in FIG. 2. The powered line rollers 26 are controlled by controller 250 to move the full pallet onto the lift conveyor 18, in response to signals from a detector 252 positioned adjacent to the powered line rollers 26 (FIGS. 1 and 6), as indicated in block 310 of FIG. 7. As the pallet 13 reaches tilt bed 16, a photo eye detector 254 (FIGS. 1 and 6) positioned adjacent tilt bed 16 signals controller 250 to stop the rotation of the powered line rollers 26. If the pallet is not aligned in the proper position, controller 250 signals drive unit 48 to continue rotating powered line rollers 26 until the pallet 20 is in the proper position against the tilt bed portion 30 as shown in block 312. Next, the tilt bed cylinders 86 are actuated to move the tilt bed 16 to the tilted position as indicated in block 314 and as shown in FIG. 3. Controller 250 then actuates the lift drive unit 72 as shown in block 316. After the lift motor has been started, the controller 250 checks the light curtain 170 to determine whether any part of the light curtain is blocked, as indicated in decision block 318. As soon as the light curtain is partially blocked, the upward movement of the pallet 20 is then continued for a predefined distance from the light tree detector position as shown in block 320. The predefined distance is a distance slightly less than the height of a layer of units. The height of each layer may be manually entered into the controller by a user through a keyboard or other well-known means, or may be automatically entered through an appropriately positioned bar code reader and bar code label associated with one or more layers of units (depending on the height of each layer) or associated with the pallet 20 itself. In an alternative embodiment, when the upper layer of units first intersects the light curtain, the controller 250 or a user may actuate a laser that creates a visible spot or line on the upper layer of units. The units are then lifted by manual actuation of drive unit 72 while the distance traveled is being monitored, until the laser beam is located between the upper and adjacent layers of units. The user then sends a signal to controller 250 which stores the distance traveled, which is reflective of the unit height in the upper layer. This technique may be used for subsequent layers if they differ in height from each other. When the predefined distance has been traveled by the pallet 20, controller 250 stops the lift drive unit 72 as shown in block 322.

Referring to FIG. 8, in the event that the lift motor was stopped in block 322 after at least one unit 22 was detected on the pallet 20, controller 250 actuates the back dam actuator cylinder 238 to move the back dam forwardly until the back dam is positioned adjacent the back of the unit(s) 22, as shown in block 330. The back dam in it's extended position engages the uppermost layer of units and an adjacent lower layer of units. This a vast improvement over the prior art since the back dam is no longer trying to push the units off. It functions only to back-up the layer being collected and the layer below in case the product is pushed backward. Normally, the 25 degree angle of the product (determined by the angle of the lift conveyor) creates enough resistance to prevent significant backward force. The controller 250 then supplies a signal to actuate the low-speed motor 154 of collector drive unit 108 to run the collector belt 44 at low speed as shown in block 332. Controller 250 simultaneously actuates cable cylinder 134 to drive the nose portion 105 and collector belt 44 toward the back dam assembly 38 as shown in block 334. As the nose portion 105 and collector belt move to the extended position as shown in FIG. 3, the collector belt rotates counter-clockwise (as viewed in FIG. 3) and engages a lower portion of each unit on the upper layer of units. The collector belt rotation causes the units to be rotated clock-wise from their initial 25 degree angle to approximately 10 degrees or less. This further reduces the possibility of units toppling. Since the collector belt initially engages a lower portion of each unit, the upper layer of units has a tendency to be pushed slightly backward. Due to friction between the upper layer and adjacent lower layer, the adjacent lower layer also has a tendency for slightly backward movement. The back dam assembly 38 provides a back stop 225 as described above for preventing such backward movement. Once the units of a layer are loaded onto the collector belt 44, they are moved in a direction as indicated by arrow 258 in FIG. 3 due to the rotation of the collector belt.

A proximity detector 256 (FIG. 6) is placed at an appropriate position on tower frame 39 and detects whether the collector belt 44 is in its fully extended position as shown at decision block 336. If the collector belt 44 is not at its fully extended position, the collector belt continues to move toward the back dam. When the collector belt 44 is at its fully extended position, the entire upper layer 32 (whether there be one or several units in the layer), will be moved onto the collector belt. At the fully extended position, the proximity detector 256 signals to the controller 250 that the collector belt is at its fully extended position. Controller 250 then shuts off the low-speed motor 154 while simultaneously actuating the high-speed motor 152. The collector belt is run at high speed as shown in block 338, and simultaneously the controller 250 actuates cable cylinder 124 to move in the opposite direction, thus retracting the collector belt to it's home position and transferring the entire layer of units to the metering belt 182. The metering belt 182 is initially running at high speed for receiving the layer of units. Once all units of a layer are transferred to the metering belt 182, the metering belt is then rotated at the intermediate speed, causing the layer of units to travel quickly to the kicker roller 36. Once a first row of units contacts the kicker roller, the metering belt 182 is rotated at the slow speed, thereby preventing units from being pushed over the kicker roller. The kicker roller rotates for a fraction of a second, to transfer each row of the layer to the unscrambler conveyor 35. The metering belt cycles between low speed when the kicker is running and intermediate speed when it is not, until all rows of the layer are discharged as indicated by a photo eye (not shown). The metering belt is then run at the high speed for receiving another layer of units from the collector belt 44. As shown in block 342, once the collector belt is in the home position, the collector belt is again run at the low speed by actuating the low-speed motor 154. The back dam is then retracted as shown in block 344. At decision block 346, the controller 250 decides on whether additional layers of units must be removed from the pallet. This information may be entered manually by an operator, by a bar code located on the unloaded units or on the pallet itself, or it may be in the form of a signal from a proximity switch (not shown) located at an upper end of the tilt bed or proximate to the light curtain 170 for detecting when the pallet has reached its maximum height, i.e., when the pallet no longer has boxes located thereon. In the event that an operator enters the signal to the controller, the signal may contain information that only a certain number of layers need be removed. For example, on a pallet having six layers of boxes, it may be required that only three of the upper layers be removed while the remaining three layers are shipped to another location. This information may also be provided by a bar code located on the units or on the pallet itself or through any other well known means of providing a signal to the controller. If additional layers are to be removed as shown at block 346, the pallet is lifted again for a predefined upward distance from the light curtain detect position as indicated by the return to B in FIG. 7. If additional layers are not to be removed, or if the last layer has been removed, the lift conveyor 18 is driven to its lower limit as shown at block 348 in FIG. 9. The tilt bed is then moved to an upright position by actuation of the tilt bed cylinders 56, as shown in block 350. The lift conveyor is then operated as shown at block 352 such that powered line rollers 26 drive the pallet away from the tilt bed.

Figure 10:
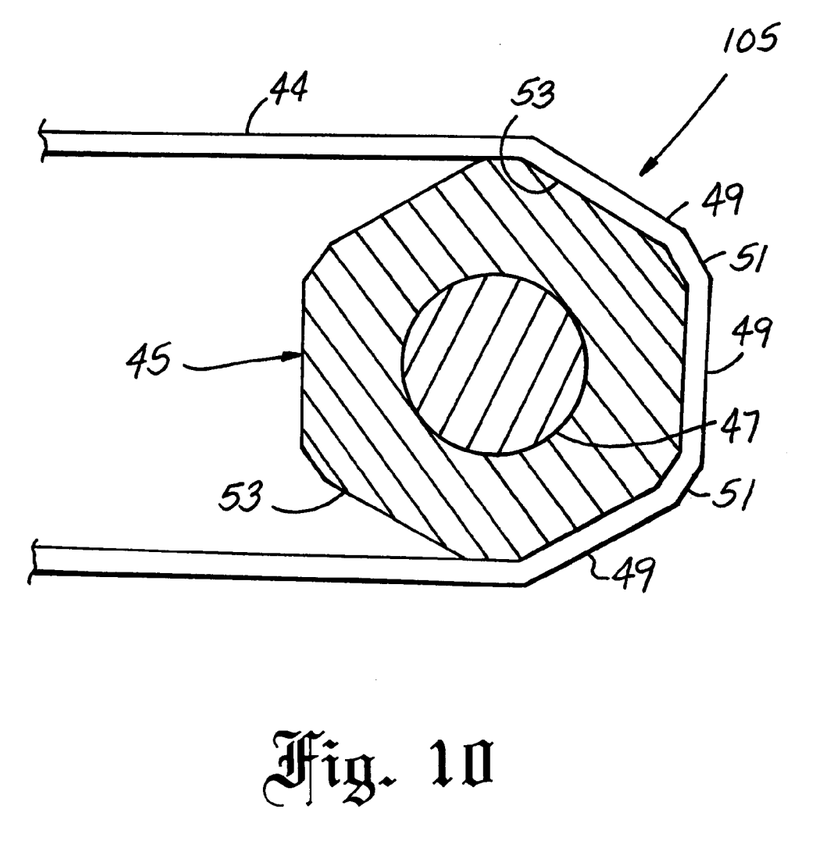
FIG. 10 is a partial cross sectional view of the nose portion of the collector belt assembly taken along line 10—10 of FIG. 5.

FIG. 10 is a partial cross-sectional view of the nose portion 105 of the collector belt assembly 33 taken along line 10—10 of FIG. 5. In the nose portion 105, the collector belt 44 extends over a roller 45 mounted on a shaft 47. The shaft 47 is rotatably mounted on opposing bracket assemblies 122, as generally depicted in FIG. 5. The shaft 47 is preferably made of a hardened steel and the roller 45 may be formed integrally with the shaft or comprised of a different material mounted on the shaft and suitable for engaging the belt 44. The roller 45 preferably has a cross-section shaped in the form of a hexagon with a plurality of substantially flat surface areas. The belt 44 extends over the roller 45 tends to conform to the shape of the roller and presents a series of substantially flat surface areas 49 separated by corner areas 51 in sequence. As the collector belt assembly 33 is extended toward a layer of units, such as units 22 depicted in FIG. 5, the roller 45 is rotated and the flat areas 49 and corner areas 51 engage a first row of a layer of units. The sequential application of flat areas 49 and the corner areas 51, as the roller 45 is rotated, facilitates the transfer of the units onto the moving collector belt 44.

The roller 45 is shown in FIG. 10 as having substantially a hexagon shape. Other polygon shapes with more or fewer substantially flat areas may be used in the depalletizing of units 22 of various different dimensions. One particular embodiment of the invention, the diameter of roller 45 is approximately 2 inches between opposing flat sides 53.

It will be understood, that the above described arrangement is merely illustrative in application of the principles of the invention and variations thereof may be devised by those skilled in the art without departing from the spirit and scope of the invention. Particularly, the sequence of performing various operations described herein may be altered without significantly changing the operation of the system. Moreover, although the metering belt first speed has been described as being equivalent to the collector belt second speed, different speeds may be required to close the gaps between rows of units. The metering belt itself could run at a single speed faster than the collector belt second speed when the unscrambler conveyor is parallel to the metering belt.

What is claimed is:

1. A depalletizer in which articles stacked in layers on a pallet are removed from the pallet, the depalletizer comprising:
    an upstanding frame defining an inner spacial area, the frame having a loading end and an unloading end and opposed sides;
    a tilt bed having an upper end and a lower end pivotally mounted with respect to the frame for tilting movement between a substantially vertical position to a tilted position wherein the upper end is disposed within the inner spacial area of the frame;
    a lift bed mounted to the tilt bed for vertical translation with respect thereto for lifting a pallet from a lowered position adjacent the lower end to a pallet unloading position adjacent the upper end of the tilt bed;
    an endless collector belt rotatably mounted between the opposed sides of the frame for movement between a first retracted position and a second extended position with respect to the loading end of the frame;
    collector belt guide apparatus mounted to the frame and extending substantially perpendicularly to the tilt bed when the tilt bed is in the tilted position and comprising a fixed end and a movable end, the movable end comprising a roller having a polygon shaped cross section rotatably supporting one end of the endless collector belt, the collector belt guide apparatus operable to move the movable end between the first retracted position and the second extended position for assisting in the removal of articles from a pallet disposed adjacent the upper end of the tilt bed.

2. The depalletizer according to claim 1, and further comprising a power drive mounted to the endless collector belt to rotate the endless collector belt in a direction to drive articles from the pallet to the unloading end.

3. The depalletizer according to claim 2, wherein the power drive for the collector belt is operable to rotate the collector belt at a first speed and a second speed and wherein the collector is belt rotated at the first speed when being moved to the second extended position, such that units can be loaded onto the collector belt, and the collector belt is rotated at the second speed when being moved from the second position to the first retracted position such that units can be unloaded from the collector belt.

4. A depalletizer according to claim 3, and further comprising an endless metering belt mounted adjacent to the collector belt adjacent the unloading end of the upstanding frame, the metering belt being mounted for rotation at a first speed and at least a second speed;
    the metering belt first speed being equivalent to the collector belt second speed, wherein articles removed from a pallet are transferred at the same speed from the collector belt to the metering belt.

5. The depalletizer according to claim 4, wherein the metering belt second speed is slower than the metering belt first speed, whereby any gaps between the depalletized articles on the metering belt can be closed.

6. The depalletizer according to claim 5, wherein the metering belt is mounted for rotation at a third speed slower than the metering belt second speed, whereby articles removed from the pallet at the collector belt second speed are slowed to the metering belt third speed for transfer to a conveyor.

7. The depalletizer according to claim 3, wherein the first speed is slower than the second speed.

8. The depalletizer according to claim 1, wherein the collector belt guide apparatus comprises a pair of chain drives mounting the collector belt therebetween for moving the collector belt between the first and second positions.

9. The depalletizer according to claim 8, wherein each chain drive has idler sprockets about which a chain is trained;
    a bracket assembly mounted to opposite ends of a nose portion, each chain being connected to one of the bracket assemblies;
    the collector belt being mounted for substantially frictionless rotation about the nose portion.

10. The depalletizer according to claim 8, and further comprising a fluid cylinder for moving the chain of one of the chain drives, the fluid cylinder comprising pulley wheels about which an endless cable is trained and the cable is operably connected to the chain.

11. A depalletizer according to claim 1, and further comprising a pivot frame extending between the opposed ends of the upstanding frame and being pivotally mounted thereto, the pivot frame comprising:
    a first plate fixedly mounted to the pivot frame for pivoting movement therewith;
    a slidable frame portion mounted to the pivot frame such that the slidable frame portion is slidable with respect to the first plate, the slidable frame portion being mounted for pivoting movement with the pivot frame, the slidable frame portion including a second plate mounted thereto; and
    an actuator engaging the slidable frame portion and operative to move a leading end of the slidable frame portion along a predetermined path;
    the endless collector belt being mounted around the first and second plates, such that as the leading end of the slidable frame is moved toward the loading end, the collector belt is extended from the first position to the second position while being supported by the first and second plates.

12. The depalletizer in accordance with claim 11, wherein the pivot frame has an initial position such that the pivot frame extends at a first angle to the tilted position of the tilt bed and wherein the angle of the pivot frame relative to the tilted position is reduced as the collector belt is extended from the first position to the second position.

13. The depalletizer according to claim 1, and further comprising a drive unit for moving the lift bed between the lowered position and the unloading position, the drive unit comprising:

a drive motor mounted on the tilt bed for pivotal movement therewith, the drive motor having a drive sprocket;

a first idler sprocket mounted for rotation to the upper end of the tilt bed;

a second idler sprocket mounted for rotation to the lower end of the tilt bed;

an endless drive chain mounted between the drive sprocket and the first idler sprocket; and     an endless lift chain mounted between the first idler sprocket and the second idler sprocket, a portion of the lift chain being attached to the lift bed;

wherein the lift bed is raised and lowered by mutual rotation of the drive chain and lift chain.

14. A depalletizer according to claim 13, wherein a counterweight is attached to the lift chain opposite the lift bed, such that the lift bed is counterbalanced.

15. A depalletizer according to claim 1, and further comprising a pivot frame extending between the opposed ends of the upstanding frame and being pivotally mounted thereto and comprising:

a first plate fixedly mounted to the pivot frame for pivoting movement therewith;

a slidable frame portion mounted to the pivot frame such that the slidable frame portion is slidable with respect to the first plate, the slidable frame portion being mounted for pivoting movement with the pivot frame, the slidable frame portion including a second plate mounted thereto, one end of the slidable frame portion being attached to the bracket assemblies;

a first idler roller mounted for rotation on the slidable frame a fixed distance from the nose portion; and     a plurality of second idler rollers mounted for rotation on the pivot frame;

the endless collector belt being mounted around the first and second plates, the nose portion, the first idler roller, and the plurality of second idler rollers, such that as the slidable frame is moved toward the loading end in cooperation with the chain drives, the collector belt is moved from the first position to the second position while being supported by the first and second plates.

16. The depalletizer according to claim 1, wherein the endless collector belt has a first high friction surface and a second low friction surface, the first high friction surface being adapted for contacting and transporting articles from a pallet to be unloaded.

17. The depalletizer according to claim 1, and further comprising a back dam mounted to an upper portion of the frame and adjacent the loading end for movement between a first retracted position and a second extended position in which the back dam applies a stop for articles on the pallet to be unloaded.

18. The depalletizer according to claim 1, wherein the lift bed comprises a power conveyor for supporting and moving a pallet toward and away from the tilt bed.

19. A collector belt assembly for use in transporting articles associated with a materials handling system, the collector belt assembly comprising:

an endless collector belt rotatably mounted on a first frame for movement between a first retracted position and a second extended position;

a second slidable frame portion mounted to the first frame such that the slidable frame portion is slidable with respect to the first frame;

a collector belt guide frame mounted adjacent to the first frame and including moving apparatus for moving the collector belt between the first retracted position and the second extended position;

a bracket assembly slidably mounted to the guide frame and associated with the moving apparatus, one end of the slidable frame portion being attached to the bracket assembly;

a nose portion comprising a nose portion roller having an polygon shaped cross section mounted to the bracket assembly;

a first idler roller mounted for rotation on the slidable frame a fixed distance from the nose portion;

a plurality of second idler rollers mounted for rotation on the first frame;

the endless collector belt extending over the nose portion roller, the first idler roller, and the plurality of second idler rollers, such that as the slidable frame is moved along the guide frame, the collector belt is moved from the first position to the second position.

20. The collector belt assembly of claim 19, and further comprising a power drive mounted to the endless collector belt to rotate the endless collector belt in a direction to transport articles thereon from one location to another.

21. A depalletizer for removing articles stacked in layers from a pallet, the depalletizer comprising:

an upstanding frame having opposite ends and opposed sides;

an endless collector belt rotatably mounted between the opposed sides of the frame for movement between a retracted position adjacent one of the opposite ends and an extended position adjacent another of the opposite ends of the frame;

collector belt guide apparatus mounted to the frame and comprising a fixed end and a movable end, the movable end comprising a rotatable roller having a polygon shaped cross section rotatably supporting one end of the endless collector belt, the collector belt guide apparatus operable to move the collector belt between the retracted position and the extended position for assisting in the removal of articles from a pallet disposed within the inner spacial area.

22. The depalletizer according to claim 21, and further comprising a power drive mounted to the endless collector belt to rotate the endless collector belt in a direction to drive articles from the pallet to the unloading end.

23. The depalletizer according to claim 22, wherein the power drive is operable to rotate the collector belt at a first speed and a second speed and wherein the collector is belt rotated at the first speed when being moved to the second extended position, such that units can be loaded onto the collector belt, and the collector belt is rotated at the second speed when being moved from the extended position to the retracted position such that units can be unloaded from the collector belt.

24. The depalletizer according to claim 23, wherein the first speed is slower than the second speed.

25. The depalletizer according to claim 21, wherein the collector belt guide apparatus comprises a pair of chain drives mounting the collector belt therebetween for moving the collector belt between the retracted and extended positions.

26. The depalletizer according to claim 25, wherein each chain drive comprises idler sprockets about which a chain is trained and a bracket assembly mounted to opposite ends of a nose portion, each chain being connected to one of the bracket assemblies and the collector belt being mounted for substantially frictionless rotation about the nose portion.

27. The depalletizer according to claim 25, and further comprising a fluid cylinder for moving the chain of one of the chain drives, the fluid cylinder comprising pulley wheels about which an endless cable is trained and the cable is operably connected to the chain.

28. The depalletizer according to claim 21, wherein the endless collector belt has a first high friction surface and a second low friction surface, the first high friction surface being adapted for contacting and transporting articles from a pallet to be unloaded.

29. The depalletizer according to claim 21 wherein the roller has a substantially hexagon shaped cross-section.

30. The depalletizer according to claim 21 where the outer surface of the roller comprises at least six substantially flat sides.

31. A collector belt assembly for transporting articles in a materials handling system, the collector belt assembly comprising:

a stationary frame;

a movable frame slidably mounted to the stationary frame and comprising a nose portion including a roller having a polygon shaped cross section; and an endless collector belt rotatably mounted on the movable frame and the stationary frame and extending over the roller;

the movable frame operative to move the nose portion from a retracted position to an extended position wherein the polygon shaped cross section roller is positioned for engagement with articles to be transported.

* * * * *

UNITED STATES PATENT AND TRADEMARK OFFICE
CERTIFICATE OF CORRECTION

PATENT NO. : 5,899,659
DATED : May 4, 1999
INVENTOR(S) : Beilsmith

It is certified that error appears in the above-indentified patent and that said Letters Patent is hereby corrected as shown below:

```
Col. 11, line 63:
    after collector delete "is"
Col. 11, line 63:
    after belt insert --is--
Col. 14, line 12:
    after having delete "an"
Col. 14, line 12:
    after having insert --a--
Col. 14, line 52:
    after collector delete "is"
Col. 14, line 52:
    after belt insert --is--
```

Signed and Sealed this

Twenty-first Day of September, 1999

Attest:

Q. TODD DICKINSON

*Attesting Officer*  *Acting Commissioner of Patents and Trademarks*